(12) United States Patent
Kambegawa

(10) Patent No.: US 8,368,708 B2
(45) Date of Patent: Feb. 5, 2013

(54) IMAGE PROCESSING APPARATUS, IMAGE PROCESSING METHOD, AND STORAGE MEDIUM STORING CONTROL PROGRAM THEREFOR

(75) Inventor: Minoru Kambegawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 502 days.

(21) Appl. No.: 12/752,830

(22) Filed: Apr. 1, 2010

(65) Prior Publication Data
US 2010/0253694 A1    Oct. 7, 2010

(30) Foreign Application Priority Data

Apr. 1, 2009    (JP) .................................. 2009-089065

(51) Int. Cl.
*G06F 13/00* (2006.01)
*G09G 5/39* (2006.01)

(52) U.S. Cl. ........................................ 345/536; 345/531

(58) Field of Classification Search .................. 345/530, 345/531, 536, 537, 538, 547
See application file for complete search history.

(56) References Cited

U.S. PATENT DOCUMENTS

| | | | |
|---|---|---|---|
| 6,442,321 B1 | 8/2002 | Berini | |
| 6,614,960 B2 | 9/2003 | Berini | |
| 6,741,782 B2 | 5/2004 | Berini | |
| 6,801,691 B2 | 10/2004 | Berini | |
| 6,823,111 B2 | 11/2004 | Jette et al. | |
| 7,043,134 B2 | 5/2006 | Berini et al. | |
| 7,151,789 B2 | 12/2006 | Jette et al. | |
| 7,495,669 B2 | 2/2009 | Ushida et al. | |
| 7,675,523 B2 * | 3/2010 | Ushida et al. | 345/537 |
| 2002/0131667 A1 | 9/2002 | Berini | |
| 2003/0059147 A1 | 3/2003 | Berini | |
| 2004/0008943 A1 | 1/2004 | Berini | |
| 2004/0081398 A1 | 4/2004 | Jette et al. | |
| 2004/0130553 A1 | 7/2004 | Ushida et al. | |
| 2004/0131102 A1 | 7/2004 | Jette et al. | |
| 2005/0058425 A1 | 3/2005 | Berini | |
| 2006/0256120 A1 | 11/2006 | Ushida et al. | |

FOREIGN PATENT DOCUMENTS

JP    2004-220584 A    8/2004

* cited by examiner

*Primary Examiner* — Jacinta M Crawford
(74) *Attorney, Agent, or Firm* — Rossi, Kimms & McDowell LLP

(57) ABSTRACT

An image processing apparatus that enables to reduce needless consumption of memory band and control duplicated access to a main memory. A reading unit reads image data stored in a first storage unit and divides the image data into a plurality of rectangular areas of a predetermined size. A second storage unit stores image data in reference areas surrounding the rectangular areas, the reference areas having overlapped areas each of which includes a boundary between adjacent two rectangular areas. An image processing unit performs an image process based on the image data in the rectangular areas read by the reading unit and the image data in the reference areas stored in the second storage unit. A cache control unit controls to transfer the image data in the reference areas from the second storage unit to the image processing unit in response to a request from the image processing unit.

7 Claims, 17 Drawing Sheets

FIG. 7A

| ADDRESS IN MAIN MEMORY | | ADDRESS IN SECOND CACHE | |
|---|---|---|---|
| 0x3c | 0x43 | 0x0 | 0x7 |
| 0x7c | 0x83 | 0x8 | 0xf |
| 0xbc | 0xc3 | 0x10 | 0x17 |
| 0xfc | 0x103 | 0x18 | 0x1f |
| 0x13c | 0x143 | 0x20 | 0x27 |
| 0x17c | 0x183 | 0x28 | 0x2f |
| 0x1bc | 0x1c3 | 0x30 | 0x27 |
| 0x1fc | 0x203 | 0x38 | 0x3f |
| ... | ... | ... | ... |
| 0x20_7fbc | 0x20_7fc3 | 0x4_0ff0 | 0x4_0ff7 |
| 0x20_7ffc | 0x20_7fff | 0x4_0ff8 | 0x4_0ffb |

FIG. 7B

| ADDRESS IN MAIN MEMORY | | ADDRESS IN FIRST CACHE | |
|---|---|---|---|
| 0x7_8000 | 0x8_7fff | 0x0 | 0xffff |
| 0xf_8000 | 0x10_7fff | 0x1_000 | 0x1_ffff |
| 0x17_8000 | 0x18_7fff | 0x2_000 | 0x2_ffff |
| 0x1f_8000 | 0x20_7fff | 0x3_000 | 0x3_ffff |

FIG. 13

|   | A | B | C | D | E | F | G |
|---|---|---|---|---|---|---|---|
| 1 |   |   |   |   |   |   |   |
| 2 |   |   |   |   |   |   |   |
| 3 |   |   |   |   |   |   |   |
| 4 |   |   |   | a\|b\|c\|d |   |   |   |
| 5 |   |   |   |   |   |   |   |
| 6 |   |   |   |   |   |   |   |
| 7 |   |   |   |   |   |   |   |

FIG. 14

|   | A | B | C | D | E | F | G |
|---|---|---|---|---|---|---|---|
| 1 |   |   |   |   |   |   |   |
| 2 |   |   |   |   |   |   |   |
| 3 |   |   | WHITE | WHITE | WHITE | WHITE | WHITE |
| 4 | WHITE | WHITE | WHITE | ■ | ■ | ■ | ■ |
| 5 | ■ | ■ | ■ | ■ | ■ | ■ | ■ |
| 6 |   |   |   |   |   |   |   |
| 7 |   |   |   |   |   |   |   |

■ BLACK DOT DATA

☐ WHITE DOT DATA

☐ BLACK OR WHITE DOT DATA

WHEN /3C*/3D*/3E*/3F*/3G*/4A*/4B*/4C*4D*4E*4F*4G*5A*5B*5C*5D*5E*5F*5G=1 IS HELD,
4D IS CONVERTED TO "a=0, b=1, c=1, d=1".

BLACK DOT IS "1", "/" DENOTES NEGATIVE LOGIC.

FIG. 15

|   | A | B | C | D | E | F | G |
|---|---|---|---|---|---|---|---|
| 1 |   |   |   |   |   |   |   |
| 2 |   |   |   |   |   |   |   |
| 3 |   |   |   | WHITE | WHITE | WHITE | WHITE |
| 4 | WHITE | WHITE | WHITE | WHITE | ■ | ■ | ■ |
| 5 | ■ | ■ | ■ | ■ | ■ | ■ | ■ |
| 6 |   |   |   |   |   |   |   |
| 7 |   |   |   |   |   |   |   |

■ BLACK DOT DATA

WHITE  WHITE DOT DATA

☐ BLACK OR WHITE DOT DATA

WHEN /3D*/3E*/3F*/3G*/4A*/4B*/4C*/4D*4E*4F*4G*5A*5B*5C*5D*5E*5F*5G=1 IS HELD,
4D IS CONVERTED TO "a=0, b=1, c=1, d=0".

BLACK DOT IS "1", "/" DENOTES NEGATIVE LOGIC.

FIG. 16

|   | A | B | C | D | E | F | G |
|---|---|---|---|---|---|---|---|
| 1 |   |   |   |   |   |   |   |
| 2 |   |   |   |   |   |   |   |
| 3 |   |   |   |   | WHITE | WHITE | WHITE |
| 4 | WHITE | WHITE | WHITE | WHITE | WHITE | ■ | ■ |
| 5 | ■ | ■ | ■ | ■ | ■ | ■ | ■ |
| 6 |   |   |   |   |   |   |   |
| 7 |   |   |   |   |   |   |   |

■ BLACK DOT DATA

WHITE  WHITE DOT DATA

☐ BLACK OR WHITE DOT DATA

WHEN /3E*/3F*/3G*/4A*/4B*/4C*/4D*/4E*4F*4G*5A*5B*5C*5D*5E*5F*5G=1 IS HELD,
4D IS CONVERTED TO "a=0, b=0, c=1, d=0".

BLACK DOT IS "1", "/" DENOTES NEGATIVE LOGIC.

RECTANGULAR AREA
INPUT IMAGE DATA

RECTANGULAR AREA
INPUT IMAGE DATA

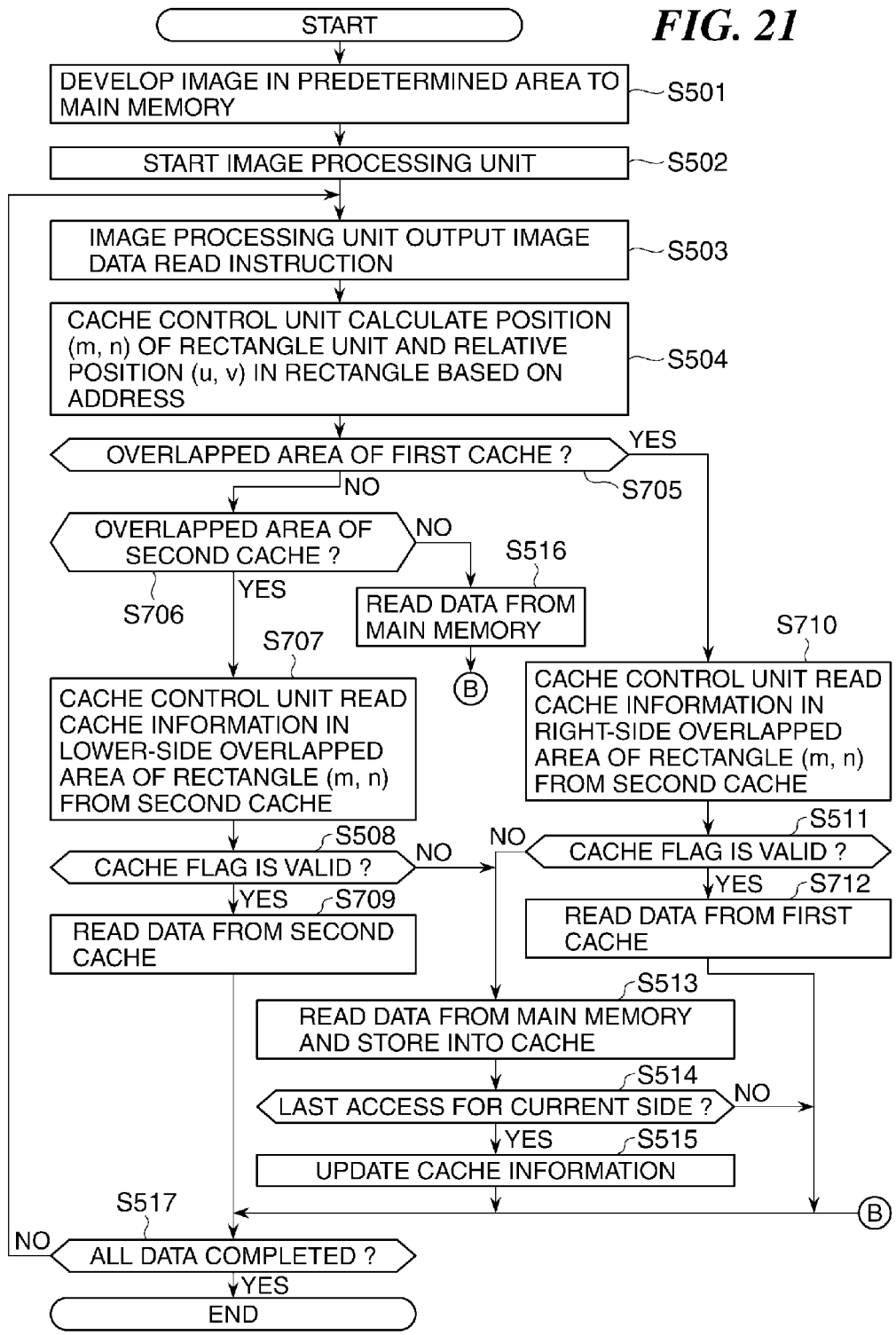

IMAGE PROCESSING APPARATUS, IMAGE PROCESSING METHOD, AND STORAGE MEDIUM STORING CONTROL PROGRAM THEREFOR

BACKGROUND OF THE INVENTION

1. Field of the Invention

The present invention relates to an image processing apparatus, an image processing method, and a storage medium storing a control program therefor.

2. Description of the Related Art

Some conventional image processing apparatuses execute an image process to image data stored in memories by units of rectangular areas. For example, an image processing apparatus disclosed in Japanese laid-open patent publication (Kokai) No. 2004-220584 (JP2004-220584A) uses image data in a reference area that is larger than a target rectangular area in order that an image processing unit executes an image process (for example, filtering) to the target rectangular area.

However, the above-mentioned conventional technique needs to read the image data from the reference area that is larger than the target rectangular area in a memory onto which the image data is developed in order that the image processing unit executes the image processing to the target rectangular area. Since the image data stored in the memory is divided into elements of a matrix by the rectangular areas, the reference area overlaps the adjacent rectangular areas around the reference area. Therefore, the image processing unit needs to read the overlapped areas repeatedly during a procedure to execute the image processing to the entire image, which causes a problem of needless consumption of memory band.

SUMMARY OF THE INVENTION

The present invention provides an image processing apparatus, an image processing method, and a storage medium storing a control program therefor, which are capable of reducing needless consumption of memory band and controlling duplicated access to a main memory.

Accordingly, a first aspect of the present invention provides an image processing apparatus comprising a first storage unit adapted to store image data, a reading unit adapted to read the image data stored in the first storage unit and to divide the image data into a plurality of rectangular areas of a predetermined size, a second storage unit adapted to store image data in reference areas surrounding the plurality of rectangular areas, the reference areas having overlapped areas each of which includes a boundary between adjacent two rectangular areas, an image processing unit adapted to perform an image process based on the image data in the rectangular areas read by the reading unit and the image data in the reference areas stored in the second storage unit, and a cache control unit adapted to control to transfer the image data in the reference areas from the second storage unit to the image processing unit in response to a request from the image processing unit.

Accordingly, a second aspect of the present invention provides an image processing method comprising a first storing step of storing image data into a first storage unit, a reading step of reading the image data stored in the first storage unit and of dividing the image data into a plurality of rectangular areas of a predetermined size, a second storing step of storing image data in reference areas surrounding the plurality of rectangular areas into a second storage unit, the reference areas having overlapped areas each of which includes a boundary between adjacent two rectangular areas, an image processing step of performing an image process by an image processing unit based on the image data in the rectangular areas read in the reading step and the image data in the reference areas stored in the second storage unit, and a cache control step of controlling to transfer the image data in the reference areas from the second storage unit to the image processing unit in response to a request from the image processing unit.

Accordingly, a third aspect of the present invention provides a computer-readable storage medium storing a control program causing a computer to execute the image processing method.

According to the present invention, since the image processing is executed to the rectangular areas of the image data developed onto the main memory as target pixels in the order different from a normal order, the needless consumption of memory band can be reduced and the duplicated access to the main memory can be controlled.

Further features of the present invention will become apparent from the following description of exemplary embodiments with reference to the attached drawings.

BRIEF DESCRIPTION OF THE DRAWINGS

FIG. 7A is a view showing a correspondence relationship between an address in the main memory and an address in the first cache according to the first embodiment.

FIG. 7B is a view showing a correspondence relationship between an address in the main memory and an address in the second cache according to the first embodiment.

FIG. 13 is a view showing a 7-by-7 window.

FIG. 14 is a view showing an example of the smoothing process executed by the logical circuit in FIG. 10.

FIG. 15 is a view showing another example of the smoothing process executed by the logical circuit in FIG. 10.

FIG. 16 is a view showing still another example of the smoothing process executed by the logical circuit in FIG. 10.

FIG. 21 is a flowchart showing a control process of a cache control unit according to the second embodiment.

DESCRIPTION OF THE EMBODIMENTS

Hereafter, embodiments according to the present invention will be described in detail with reference to the drawings.

Figure 1:
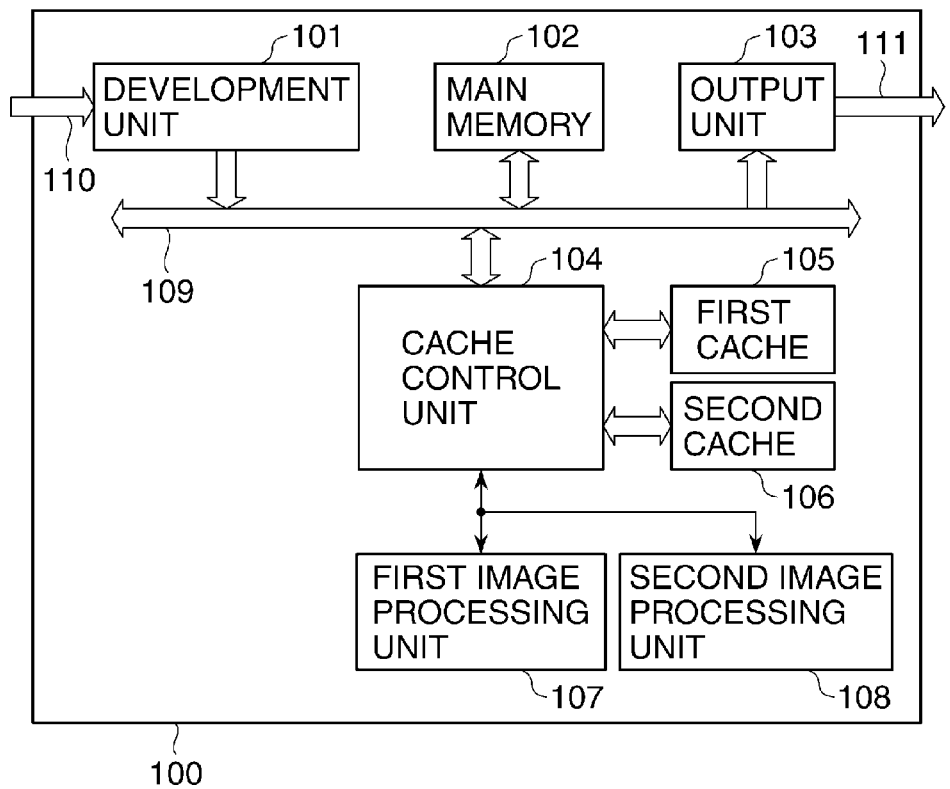
FIG. 1 is a block diagram schematically showing a configuration of an image processing apparatus according to a first embodiment of the present invention.

FIG. 1 is a block diagram schematically showing a configuration of an image processing apparatus according to a first embodiment of the present invention.

In FIG. 1, the image processing apparatus 100 develops input image data 110, applies an image process to the developed image data, and then outputs the processed image data as image data 111.

A development unit 101 develops the input image data 110 onto a main memory 102 via a bus 109. The main memory 102 stores the developed image data 110 (a first storage unit). The main memory 102 is a memory of a DDR SDRAM standard that matches needed capacity and band. Assume that the main memory 102 stores two pages of image data. Accordingly, data developed onto the main memory 102 and data read for the image process can be assigned to respective pages, which facilitates mediation between writing and reading.

Figure 2:
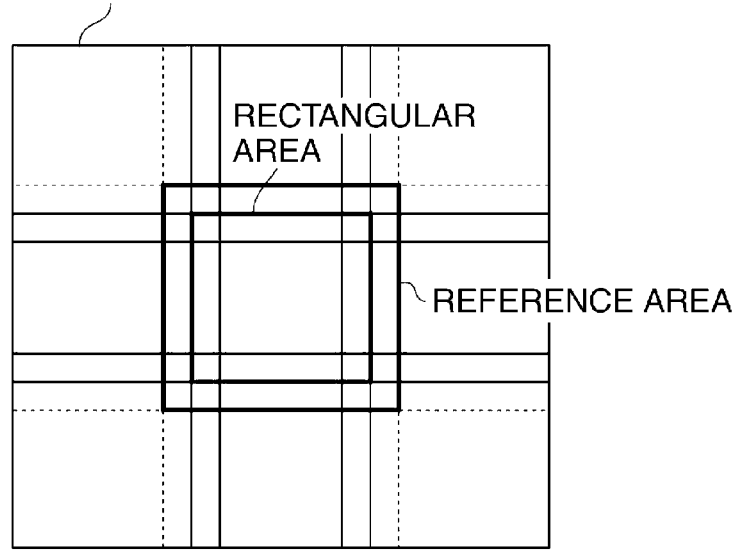
FIG. 2 is a view showing a relationship between a rectangular area and a reference area needed to perform image processing to the rectangular area in image data.

A first image processing unit 107 and a second image processing unit 108 are image processing circuits that execute image processing independently. A filtering process such as an edge enhancement process and a smoothing process is assumed as the image process. In any case, a value of a target pixel is updated or is interpolated with reference to values of peripheral pixels. When processing the target pixel, the peripheral pixels, for example, a peripheral area of a 9-by-9 matrix is referred to. When considering that such image processing is applied to the pixels in a boundary area between target rectangular areas (rectangle image data), an area that is larger than the target rectangular area by four pixels in a principal scanning direction and an auxiliary scanning direction is needed as a reference area. FIG. 2 shows a relationship between the rectangular area and the reference area needed to perform image processing to the rectangular area in the image data.

FIG. 2 shows an example of one-page image data that is divided into a plurality of rectangular areas in the principal scanning direction (a principal direction) and the auxiliary scanning direction (an auxiliary direction), for example, nine areas of a 3-by-3 matrix, each of which has a predetermined size. For example, assuming that the center rectangular area is a target rectangular area, a rectangular area that surrounds the target rectangular area and has mutually overlapped area including a boundary of the adjacent two rectangular areas is the reference area needed to execute the image process to the target rectangular area. When considering the reference area for each rectangular area in the page, it is understood that the area where the overlapped area in the principal scanning direction (a horizontal direction in FIG. 2) crosses the overlapped area in the auxiliary canning direction (a vertical direction in FIG. 2) becomes a lattice.

The image processing apparatus 100 is possible to apply the image process to two rectangular areas in the image data in the main memory 102 simultaneously and concurrently by the first and second image processing units 107 and 108. It should be noted that the fact that two image processing units are provided does not limit the scope of the present invention. The type of the image process does not limit the scope of the present invention.

In FIG. 1, a cache control unit 104 receives image data read instructions outputted from the first and second image processing units 107 and 108. The image data read instruction has address information about data. The amount of data transmitted in response to one instruction is 32 bytes that is equal to a transfer unit of the main memory 102. The cache control unit 104 transfers the image data read instruction received to the main memory 102, controls first and second caches 105 and 106 according to this image data read instruction, and performs a process described below.

The first cache 105 is an SRAM (a second storage unit) that caches data in an overlapped area between two rectangular areas (rectangle image data) adjacent in the auxiliary scanning direction in the image data developed onto the main memory 102. The second cache 106 is an SRAM (the second storage unit) that caches data in an overlapped area between two rectangular areas (rectangle image data) adjacent in the principal scanning direction in the image data developed onto the main memory 102.

Next, definitions of constants used in the first embodiment will be described with reference to FIG. 3.

Figure 3:
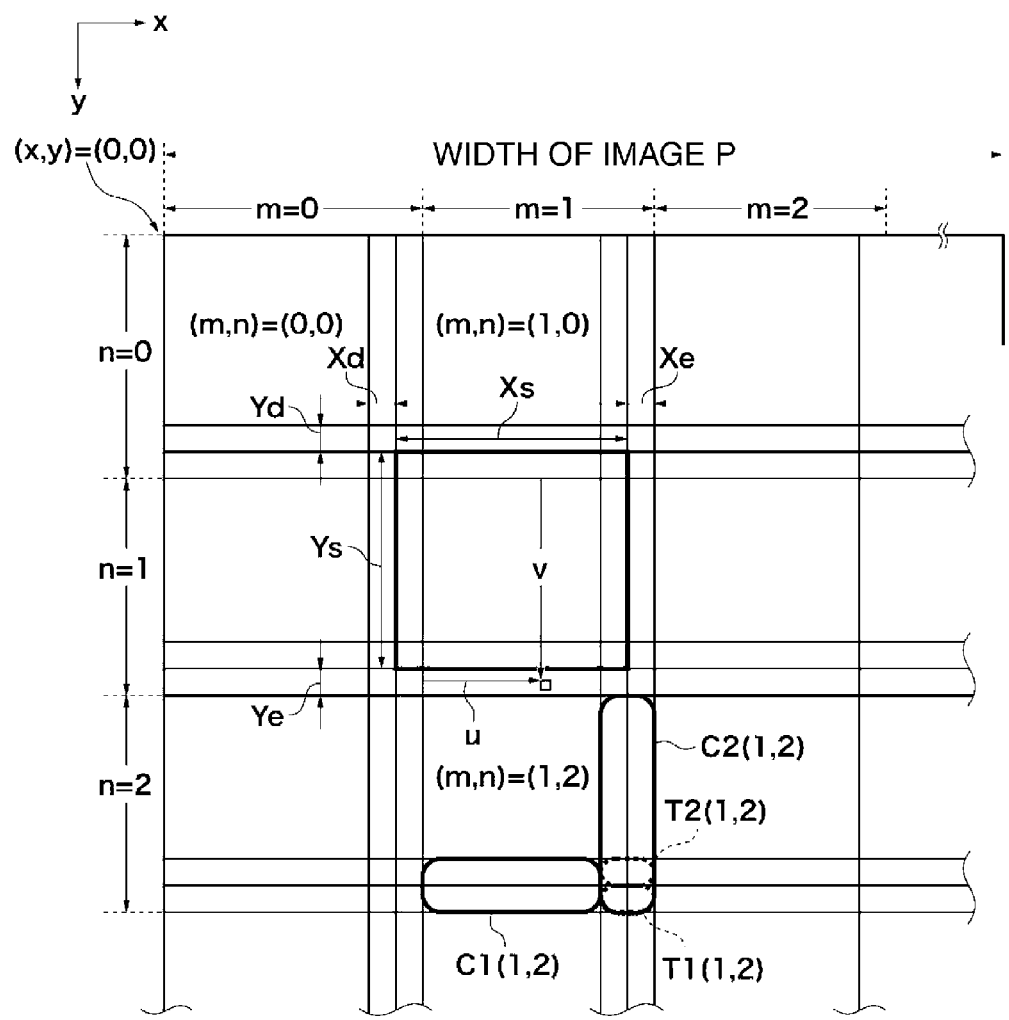
FIG. 3 is a view showing the image data for describing definitions of constants used in the first embodiment.

In FIG. 3, x and y express a coordinate in an image, the upper left of the image is an origin, x represents a position in the horizontal direction, and y represents a position in the vertical direction. Signs Xs and Ys are constants that represent a rectangular size. Signs Xd and Xe are constants that represent extension amounts of the reference area off the rectangular area in the horizontal direction. Signs Yd and Ye are constants that represent extension amounts of the reference area off the rectangular area in the vertical direction. A sign m is a variable that represents a horizontal position number of an area in which the target coordinate belongs when the image data is divided into a plurality of areas by lower and left edges of the reference areas. A sign n is a variable that represents a vertical position number of the area in which the target coordinate belongs when the image data is divided into the plurality of areas by lower and left edges of the reference areas. A sign u is a variable that represents a relative horizontal position of the target coordinate in the area defined by the combination of numbers (m, n) in which the target coordinate belongs. A sign v is a variable that represents a relative vertical position of the target coordinate in the area defined by the combination of numbers (m, n) in which the target coordinate belongs.

For example, a memory of the first cache 105 for an area defined by (m, n)=(1, 2) corresponds to an area C1(1, 2). A memory of the second cache 106 corresponds to an area C2(1, 2). An area T1(1, 2) in the area C2(1, 2) stores tag information and flag information corresponding to the area C1(1, 2), and an area T2(1, 2) stores tag information and flag information corresponding to the area C2(1, 2).

Figure 4:
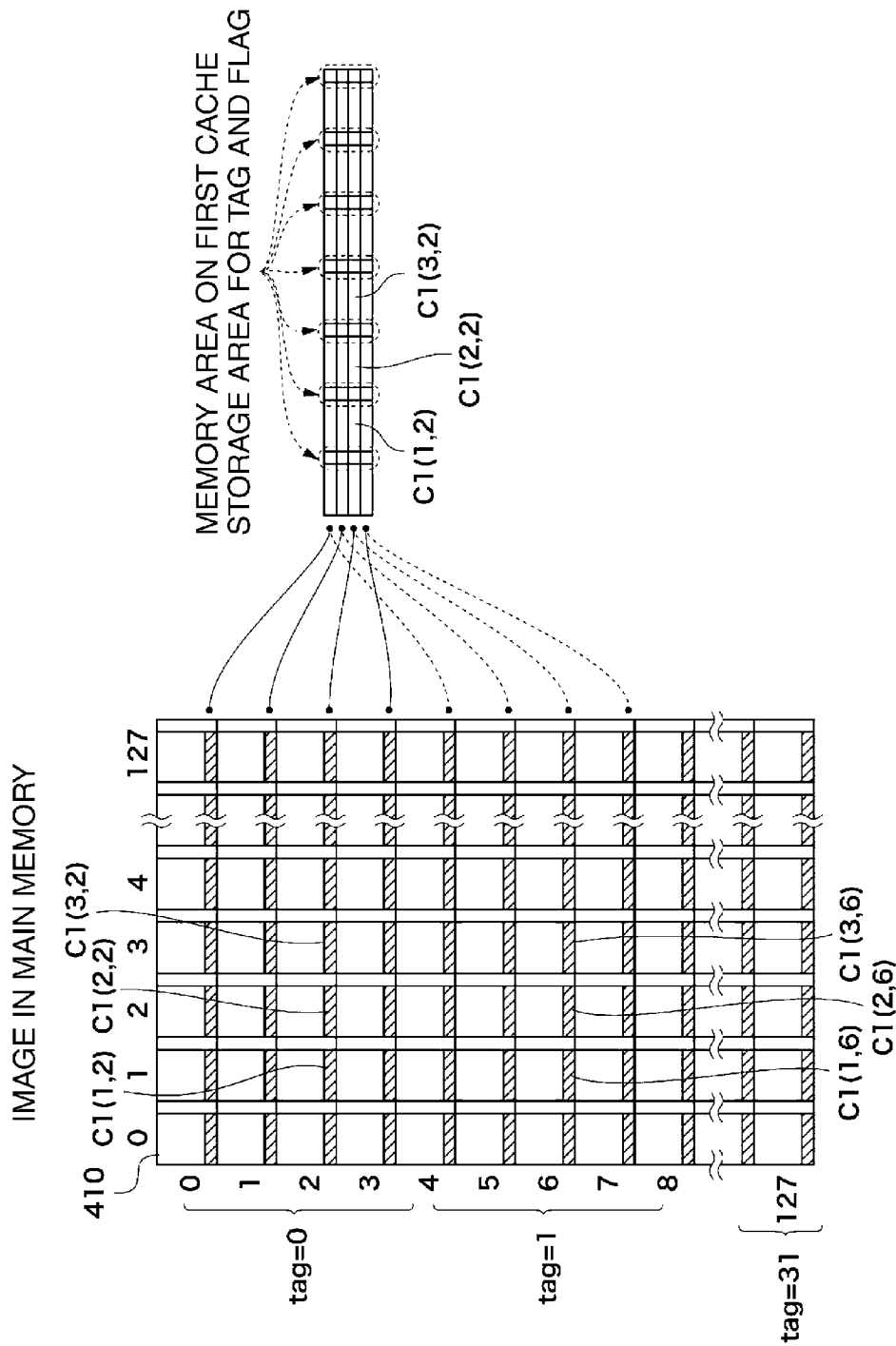
FIG. 4 is a view showing a correspondence relationship between the image data in a main memory and a memory area on a first cache according to the first embodiment.
Figure 5:
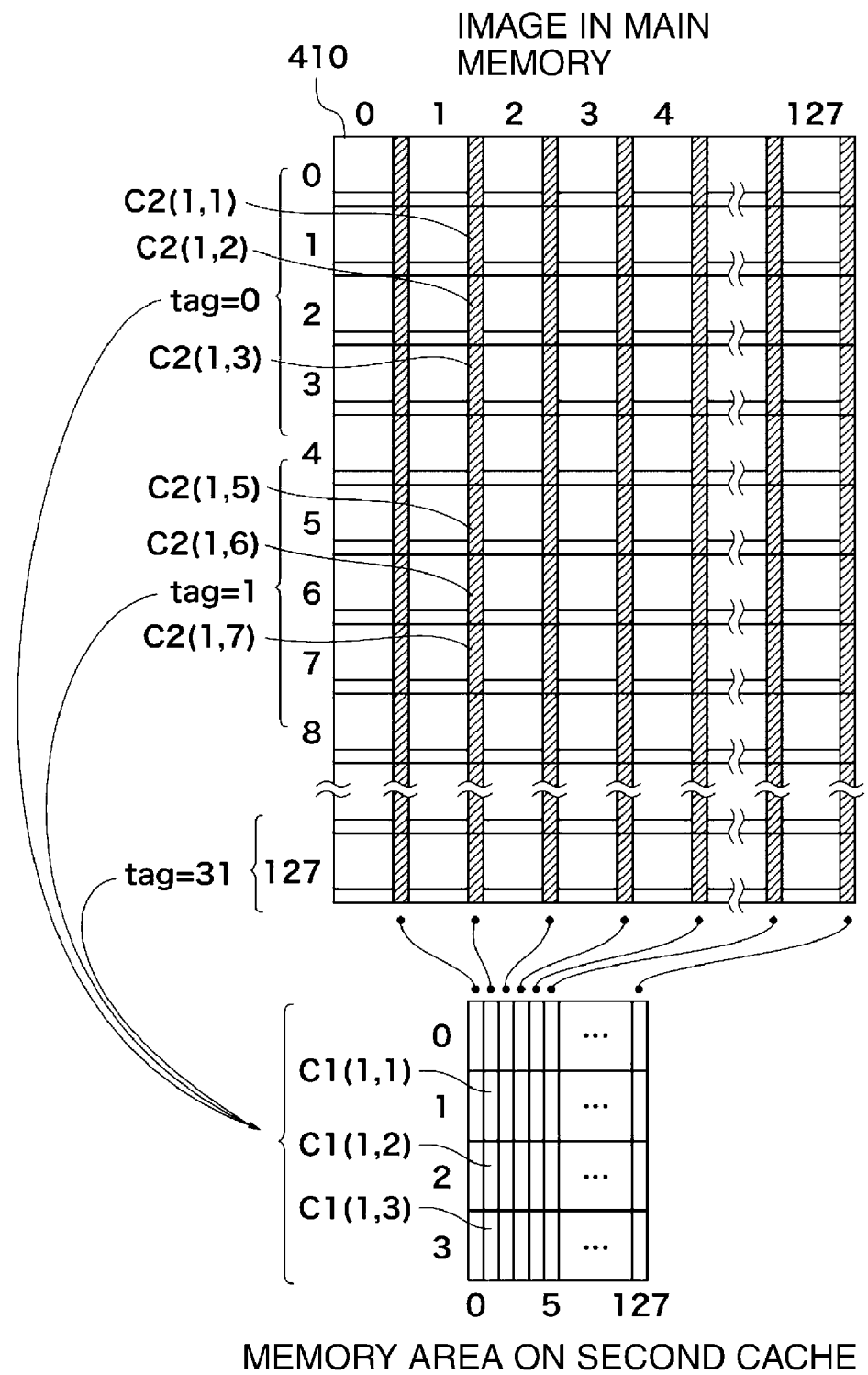
FIG. 5 is a view showing a correspondence relationship between the image data in the main memory and a memory area on a second cache according to the first embodiment.

FIG. 4 is a view showing a correspondence relationship between the image data in the main memory 102 and a memory area on the first cache 105 according to the first embodiment. FIG. 5 is a view showing a correspondence relationship between the image data in the main memory 102 and a memory area on the second cache 106 according to the first embodiment.

A reference numeral 410 shown in FIG. 4 and FIG. 5 denotes an image developed onto the main memory 102. An origin of an address is a left upper corner, the principal scanning direction is an X-direction, and the auxiliary scanning direction is a Y-direction. Here, a length of one page of image data in the principal scanning direction corresponds to 128 pieces of rectangular areas.

In FIG. 4, an overlapped area C1(m, n) in the image 410 corresponds to one storage area of the first cache 105. In this embodiment, the first cache 105 has a capacity corresponding to overlapped areas within the entire range in the principal scanning direction and four pieces of the rectangular areas in the auxiliary scanning direction. For example, areas C1(1, 2), C1(2, 2), and C1(3, 2) in the image 410 are equivalent to areas C1(1, 2), C1(2, 2), and C1(3, 2) in the first cache 105. A areas C1(1, 6), C1(2, 6), and C1(3, 6) in the image 410 correspond to the areas C1(1, 2), C1(2, 2), and C1(3, 2) in the first cache 105. That is, if data in the area C1(1, 6) is accessed after data in the area C1(1, 2) is cached, the data in the first cache 105 is overwritten.

The cache control unit 104 decodes data in an address area for four rectangles in the auxiliary scanning direction, and calculates an address of a cache memory. It is necessary to store a higher order address, which distinguishes the address area from others, into the cache as tag information. The flag information for determining whether the data in the cache is valid or not is also required.

In FIG. 5, an overlapped area C2(m, n) in the image 410 corresponds to one storage area of the second cache 106. In this embodiment, the second cache 106 has a capacity corresponding to overlapped areas within the entire range in the principal scanning direction and four pieces of the rectangular areas in the auxiliary scanning direction. For example, the areas C2(1, 1), C2(1, 2), and C2(1, 3) in the image 410 are equivalent to the areas C2(1, 2), C2(1, 2), and C2(1, 3) in the second cache 106. The areas C2(1, 5), C2(1, 6), and C2(1, 7) in the image 410 correspond to the areas C2(1, 1), C2(1, 2), and C2(1, 3) in the second cache 106. That is, if data in the area C2(1, 5) is accessed after data in the area C2(1, 1) is cached, the data in the second cache 106 is overwritten. It should be noted that the present invention does not restrict the size of the cache memory and does not restrict how the memory area of the main memory 102 is divided corresponding to the cache memory.

The tag information and flag information mentioned above are prepared for respective data units in a cache in a general cache. However, since a unit of update of the cache memory is necessarily corresponding to an area of each side of a rectangle in the system according to this embodiment, a set of the tag information and flag information can be stored in an area that belongs to the each side. That is, it is possible to reduce areas to store the tag information and flag information as compared with a general cache system. It should be noted that another SRAM may be prepared in order to store information about the tag and flag. However, since an increase in the number of devices by preparing another SRAM has great influence upon an occupation area on a semiconductor, it is desirable to store into a free area of the first cache.

The above-mentioned free area is an area where the overlapped areas cross like a lattice. Since this lattice area is allocated to the second cache, the cache memory does not use this area to store data. The lattice area where the overlapped areas cross may be included in the first cache (a second embodiment).

Figure 6:
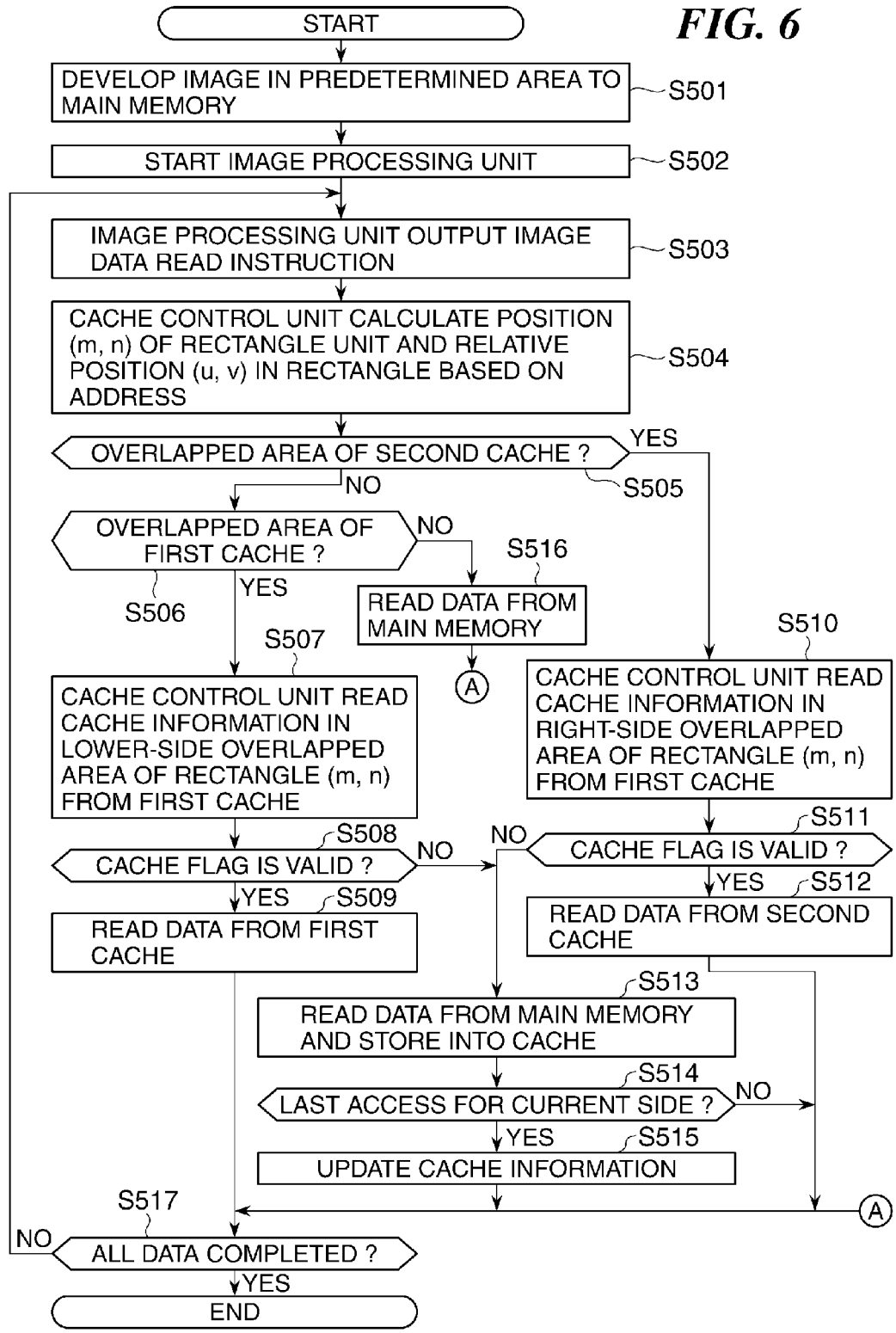
FIG. 6 is a flowchart showing a control process of a cache control unit according to the first embodiment.

FIG. 6 is a flowchart showing a control process of the cache control unit 104 according to the first embodiment.

In FIG. 6, an image development process to the main memory 102 in step 501 and a process after step S502 are shown as time sharing to make description be easily understood. As previously described, it is more desirable to divide the main memory 102 into two areas, to use one area for developing and the other area for reading, and to exchange functions when both operations are finished, from a viewpoint of performance.

In step S503, the first image processing unit 107 or the second image processing unit 108 outputs an image data read instruction to the cache control part 104 to execute an image process. The first and second image processing units 107 and 108 execute reading operations independently. The cache control unit 104 selects one of instructions outputted from the two image processing units, and executes a process in step S504 and afterward.

In the step S504, the cache control unit 104 calculates a position (m, n) of a rectangle unit and a relative position (u, v) in the rectangle based on address information included in the image data read instruction received. The positions are calculated according to the following formulas.

$$x = A \% P$$

$$y = A/P$$

$$m = (|x - Xe|)/Xs$$

$$n = (|y - Ye|)/Ys$$

$$u = (x - Xe) \% Xs$$

$$v = (y - Ye) \% Ys$$

A symbol "A" denotes an address of the image data reading request, a symbol "%" denotes an operator to find a remainder of a division, and a symbol "/" denotes an operator to find a quotient of a division. In order to simplify the division process, values of P, Xs, and Ys are preferably exponentiations of 2. A division process by an exponentiation of 2 is replaced by a bit shift process.

In step S505, the cache control unit 104 determines whether the requested address is included in the overlapped area of the second cache 106. When the following conditional expression is satisfied, the above-mentioned address is included in the overlapped area of the second cache 106.

$$Xs - Xd \leq u < Xs + Xe$$

When it is determined that the requested address is included in the overlapped area of the second cache 106 (YES in the step S505) as a result of the determination in the step S505, the process proceeds to step S510.

In the step S510, cache information (information about a tag and a flag of a cache) of the right-side overlapped area of the rectangle specified by (m, n) is read from the first cache 105. The address where the cache information is stored in the first cache 105 is given by the following formula.

$$n(Yd + Ye)P + Xs(m+1)$$

Next, in step S511, when the cache flag in the right-side overlapped area is valid (YES in the step S511), the cache control unit 104 reads data from the second cache 106 in step S512. The address where the data is stored in the second cache 106 is given by the following formula.

$$y(Xd + Xe)P/Xs + m(Xd + Xe) + u - Xs + Xd + Xe$$

In the step S511, when the cache flag in the right-side overlapped area is invalid (NO in the step S511), the cache control unit 104 reads data from the main memory 102 and stores the data into the corresponding address in the cache in step S513. The address is given by the above-mentioned formula.

Next, in step S514, the cache control unit 104 determines whether the access is the last access for the current side. Only when a result of the determination in the step S514 is YES, the cache control unit 104 stores the cache information (the information about the tag and flag of the cache) into an applicable area in the first cache 105 to update (step S515). The address is given by the formula described previously.

When it is determined that the requested address is not included in the overlapped area of the second cache 106 (NO in the step S505) as a result of the determination in the step S505, the process branches to step S506. It is determined whether the requested address is included in the overlapped area of the first cache 105 by the following conditional expression. When the following conditional expression is satisfied, it means that the requested address is included in the overlapped area of the first cache 105.

$$Ys-Yd \leqq v < Ys+Ye$$

When it is determined that the requested address is not included in the overlapped area of the first cache 105 (NO in the step S506) as a result of the determination in the step S506, the cache control unit 104 reads data from the main memory 102 (step S516). On the other hand, when it is determined that the requested address is included in the overlapped area in the first cache 105 (YES in the step S506), the cache control unit 104 reads data from the first cache 105 in step S507. The address where the data in the first cache 105 is stored is given by the following formula.

$$P\{n(Yd+Ye)+v-Ys+Yd+Ye\}+x$$

In step S508, if the cache flag in the right-side overlapped area is invalid (NO in the step S508), the process proceeds to the step S513. On the other hand, when the cache flag in the right-side overlapped area is valid (YES in the step S508), the cache control unit 104 reads data from the first cache 105 in step S509.

The above mentioned control procedure is performed by the cache control unit 104 for one data transfer request, and the procedure is repeated until it is determined that the procedures are performed for all pieces of the data in the step S517. For example, it is assumed that Xs=Ys=0×40 (64), Xe=Ye=Xd=Yd=4, and a page size in the auxiliary scanning direction is 0×2000 (8192). Accordingly, a correspondence relationship between the address in the main memory 102 and the address in the second cache 106 is as shown in FIG. 7A, and a correspondence relationship between the address in the main memory 102 and the address in the first cache 105 is as shown in FIG. 7B. The addresses described here are expressed in units of pixels. That is, when one pixel is defined by one byte, the correspondence relationship is as shown in the tables in FIG. 7A and FIG. 7B. On the other hand, an address in a system where one pixel takes four bytes becomes four times, for example.

Figure 8:
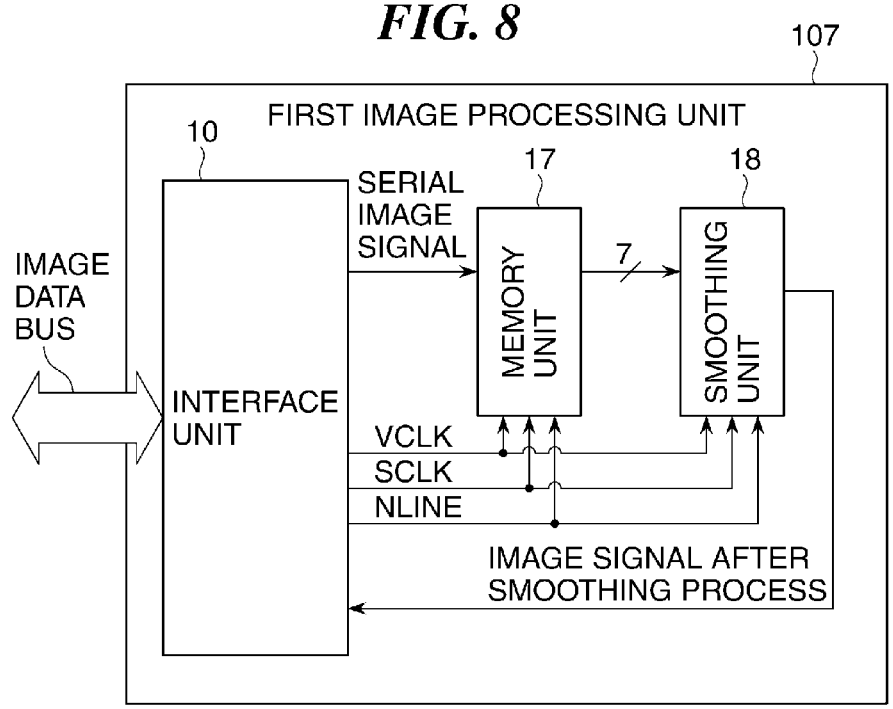
FIG. 8 is a view schematically showing an configuration of a smoothing circuit mounted in a first image processing unit of the image processing apparatus in FIG. 1.

FIG. 8 is a view schematically showing an configuration of a smoothing circuit mounted in the first image processing unit 107 of the image processing apparatus 100 in FIG. 1. It should be noted that a description of the second image processing unit 108 is omitted because of the same configuration as the first image processing unit 107.

The first and second image processing units 107 and 108 have smoothing functions, individually. Parallel operations of the first and second image processing units 107 and 108 improve performance of the entire process.

The first and second image processing units 107 and 108 read necessary image data, i.e., image data in an area including overlapped areas around a rectangular area, from the main memory 102, process the image data inside the units, and then pass the image data in the rectangular area to an output unit 103.

An interface unit 10 as a bus interface converts the data read from the main memory 102 into serial data and transfers it to a memory unit 17 in synchronism with VCLK. Receiving the image signal transmitted from the interface unit 10, the memory unit 17 memorizes seven lines of principal scans. A smoothing unit 18 develops the seven lines to seven dots of the principal scans like a window, performs a smoothing process, and then outputs.

When the first and second image processing units 107 and 108 perform an image process to apply a filter such as edge enhancement etc., similar circuit configurations are needed in the sense that peripheral pixels (a reference area) of target pixels (a rectangular area) are referred to. That is, the memory unit 17 has functions of the interface with an image data bus and the memory unit for the peripheral pixels, and the smoothing unit 18 is equivalent to a logical-determination unit that determines data of the target pixels based on data of the peripheral pixels.

Figure 9:
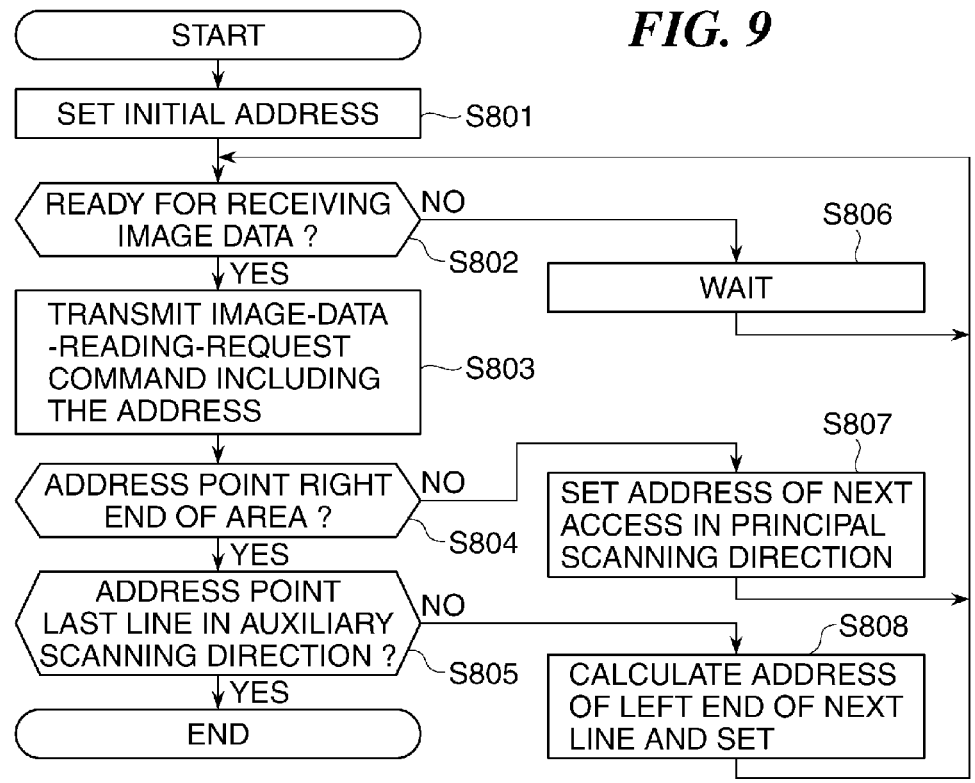
FIG. 9 is a flowchart showing a process executed when the first image processing unit of the image processing apparatus in FIG. 1 outputs an image data reading request to the cache control unit.

FIG. 9 is a flowchart showing a process executed when the first image processing unit 107 of the image processing apparatus 100 in FIG. 1 outputs an image data reading request to the cache control unit 104. It should be noted that the second image processing unit 108 also executes the same process.

First, in step S801, the first image processing unit 107 sets an initial address in an address register (not shown). The value of this address register is used at the time when an image-data-reading-request command is transmitted. This address is the address of the rectangular area including the overlapped areas.

In step S802, the first image processing unit 107 determines whether it is ready for receiving image data. When a result is NO, the process waits in step S806 until the result will be YES. When it is ready for receiving image data, in step S803, the image-data-reading-request command including the address is transmitted to the cache control unit 104.

Next, in step S804, the first image processing unit 107 checks the value of the address, and when the address does not point a right end of an image reading area including overlapped areas, the process proceeds to step S807. And the next access address in the principal scanning direction is set to the above-mentioned address register, and the process returns to the step S802. On the other hand, when the current address points the right end of the image reading area, it is checked whether the current line is the last line or not in step S805. When a result of the check is YES, this process is finished. On the other hand, when the result is NO, an address of a left end of the next line will be set in the above-mentioned address register in step S808, and the process returns to the step S802.

Figure 10:
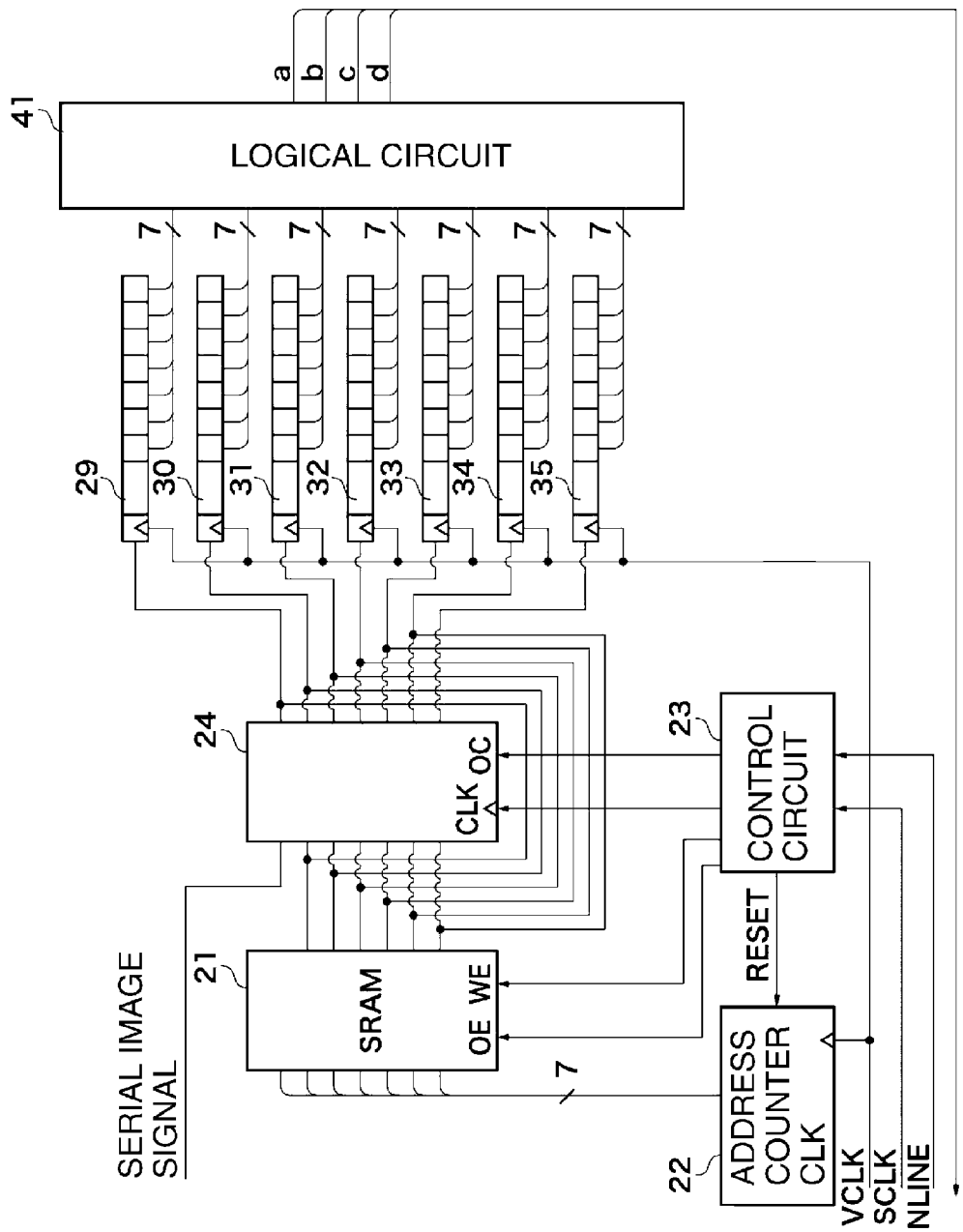
FIG. 10 is a block diagram schematically showing a detailed configuration of the first image processing unit of the image processing apparatus in FIG. 1.

FIG. 10 is a block diagram schematically showing a detailed configuration of the memory unit 17 and the smoothing unit 18 that are included in the first image processing unit 107 shown in FIG. 8. An SRAM 21, an address counter 22, a control circuit 23, a three-state latch buffer 24, and shift registers 29 through 35 correspond to the memory unit 17 in FIG. 8. A logical circuit 41 in FIG. 10 corresponds to the smoothing unit 18 in FIG. 8.

The circuit shown in FIG. 10 receives an image transfer clock VCLK, a system clock SCLK that has the same phase and eight-times frequency as the image transfer clock VCLK, and a serial image signal that is synchronized with the image transfer clock VLCK, from the interface unit 10 in FIG. 8. The serial image signal is inputted into a terminal D0 that is one of input terminals of the three-state latch buffer 24, and an output Q0 of the three-state latch buffer 24 corresponding to the signal input into the terminal D0 is inputted into both of the shift register 29 and an data terminal I/O1 of the SRAM 21. Address terminals AD0 through AD6 of the SRAM 21 are connected with seven address lines supplied from the address counter 22. It should be noted that an address length developed in these seven address lines is sufficient to store one line of the rectangle and the peripheral image data.

A read signal OE and a write enable signal WE to the SRAM 21, a latch signal CLK and an output enable signal OC to the three-state latch buffer 24, and a clear signal RESET to the address counter 22 are generated by the control circuit 23.

Figure 11:
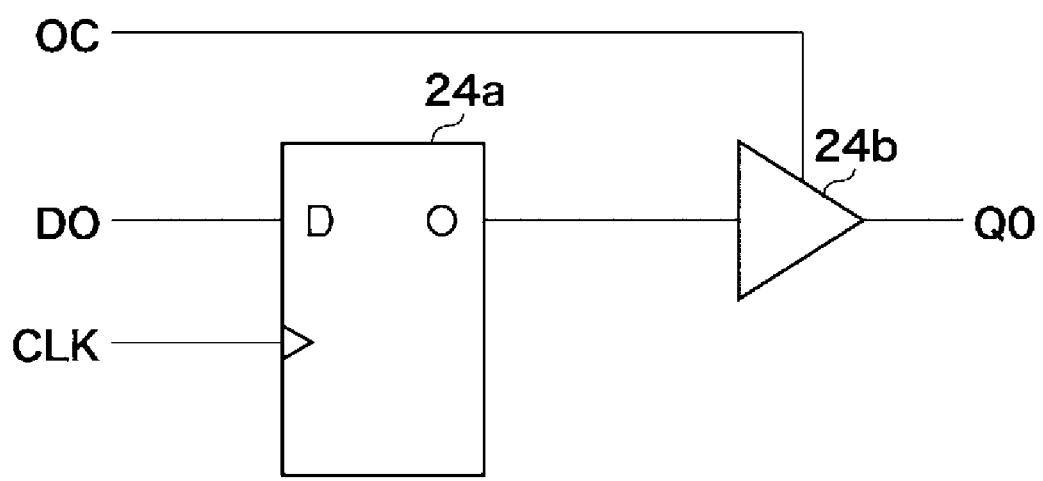
FIG. 11 is a circuit diagram schematically showing a configuration of a three-state latch buffer in FIG. 10.

The control circuit 23 generates a plurality of states according to the system clock SCLK in one period of the image transfer clock VCLK. Since the SCLK has eight-times frequency as the VCLK, eight steps can be executed in one period of the image transfer clock VLCK at the maximum. It should be noted that each buffer of the three-state latch buffer 24 comprises a latch circuit 24a and a buffer circuit 24b as shown in FIG. 11.

Next, operations of peripheral circuits of the SRAM 21 in FIG. 10 will be described with reference to FIG. 12. It should be noted that data(n) denotes data of the n-th pixel and adr(n) denotes an address in which the data is stored in the following description.

Figure 12:
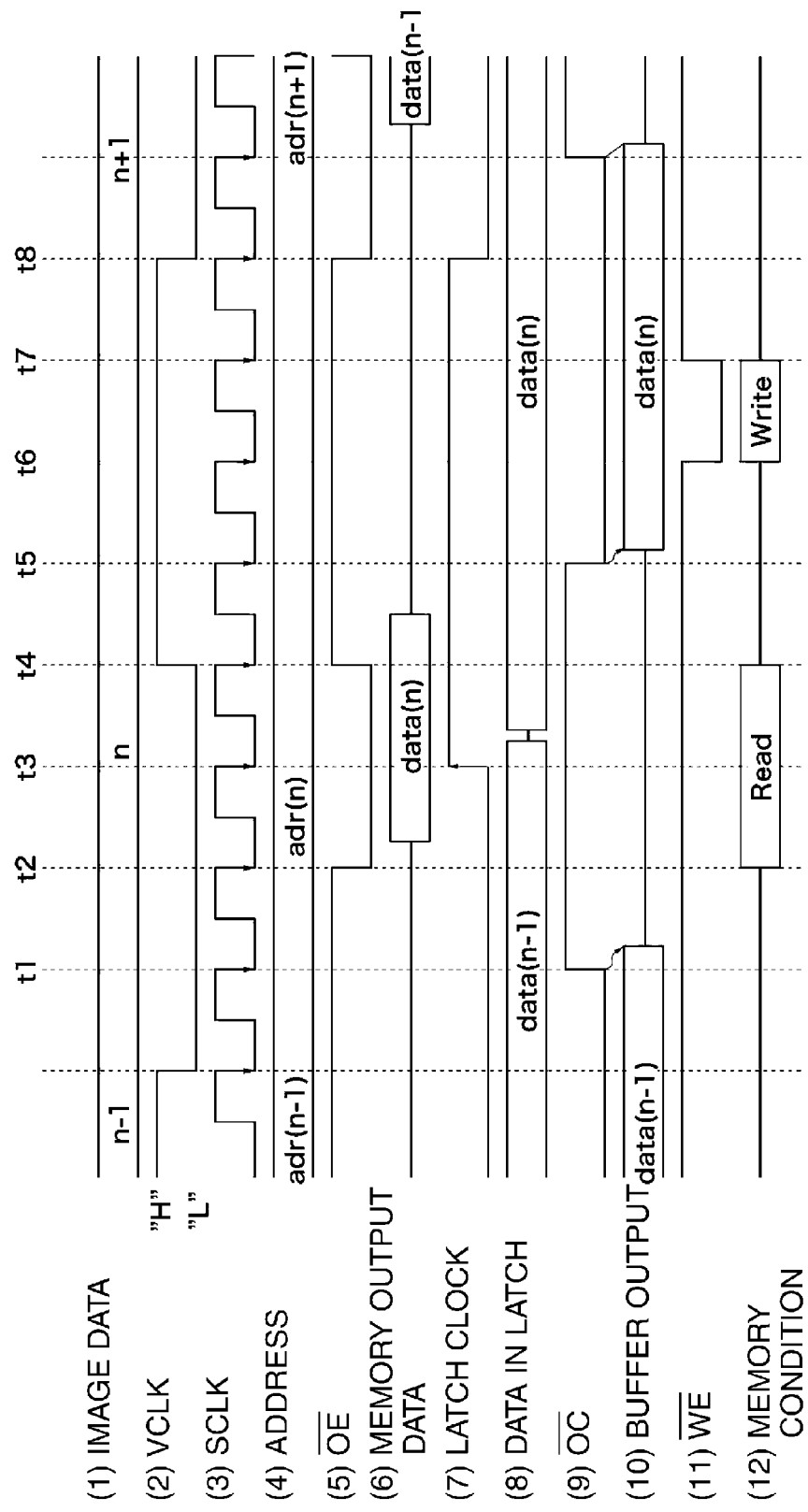
FIG. 12 is a timing chart showing operations of peripheral circuits of an SRAM in FIG. 10.

In FIG. 12, after the image transfer clock VLCK (2) becomes a logic low level, a first clock is inputted (time t1). Then, the output enable signal OC (9) to the three-state latch buffer 24 becomes a FALSE state, and the buffer circuits inside the three-state latch buffer 24 become high impedance conditions. Then, the data(n−1) that has been outputted until then (see (10) BUFFER OUTPUT) stops, and no signal is inputted to a data bus of the SRAM 21.

When a second clock is inputted (time t2), the OE signal (5) becomes a TRUE state. Simultaneously, the SRAM 21 becomes a read state (see (12) MEMORY CONDITION), and the data(n) stored in the address adr(n) is outputted on the data bus (see (6) MEMORY OUTPUT DATA).

Since a latch clock (7) comes up by a third clock (time t3), the data(n) that is currently outputted on the data bus is latched inside the three-state latch buffer 24. However, since the output enable signal OC (9) keeps the FALSE state at this time, the data is not outputted to external circuits from the three-state latch buffer 24. Therefore, a collision of a bus does not occur.

When a fourth clock is inputted (time t4), the output enable signal OE (5) to the SRAM 21 becomes the FALSE state, and the SRAM 21 enters into a floating condition. When a fifth clock is inputted (time t5), the output enable signal OC (9) to the three-state latch buffer 24 changes to the TRUE state, the latched data(n) is outputted and transmitted to the SRAM 21. However, since the write enable signal WE (11) is in the FALSE state, the SRAM 21 does not accept writing.

At a sixth clock (time t6), the write enable signal WE (11) to the SRAM 21 becomes the TRUE state, and the data(n) is written into the SRAM 21. When a seventh clock is inputted (time t7), the write enable signal WE (11) becomes the FALSE state, and the writing operation is completed. When an eighth clock is inputted (time t8), the address is updated from adr(n) to adr(n+1), and a series of operations for the data about one pixel are completed.

Since the above-mentioned operations are performed by the three-state latch buffer 24 and the SRAM 21, the data outputted from the terminal of the SRAM 21 during one cycle of the image transfer clock VCLK is inputted into another terminal of the same address. Further, since the data is transferred subsequently, the image data of seven lines is always memorized. Simultaneously, the image data is supplied to the shift registers 29 through 35.

Each of the shift registers 29 through 35 has a bit length of seven bits. The shift registers 29 through 35 apply serial-parallel conversions to the image data of the seven lines to develop to seven dots in the principal scanning direction, and send out forty nine dots of the image data to the logical circuit 41. The logical circuit 41 applies the sent-out forty nine dots of the image data to a 7-by-7 window as shown in FIG. 13, and divides a target pixel D4 into four sections a, b, c, and d of ¼ sizes in the principal scanning direction according to a predetermined logic described below. Further, a signal LP that specifies intensity of a laser light amount is determined. It should be noted that the laser-intensity-specification signal LP changes by the image transfer clock VCLK.

The logical circuit 41 comprises AND logic circuits, takes a logical AND of forty nine pieces of data from the shift registers 29 through 35. According to the logical AND, the logical circuit 41 outputs a VDO signal, which represents "print (black)" or "no-print (white)" of each of the sections a, b, c, and d that are formed by dividing one pixel into four, and the laser-intensity-specification signal LP. This laser-intensity-specification signal LP varies by one dot, and the VDO signal varies by ¼ dot.

FIG. 14 through FIG. 16 are views describing examples of the smoothing process executed by the logical circuit 41 in FIG. 10.

In FIG. 14, a logic shown in a lower right area in the figure is established. That is, when values of pixels 3C, 3D, 3E, 3F, 3G, 4A, 4B, and 4C are "0" (white) and values of pixels 4D, 4E, 45, 4G, 5A, 5B, 5C, 5D, 5E, 5F, and 5G are "1" (black), the VDO of the target pixel 4D is "a=0, b=1, c=1, and d=1". Similarly, in the case in FIG. 15, the VDO of the target pixel 4D is "a=0, b=1, c=1, and d=0". In the case in FIG. 16, the VDO of the target pixel 4D is "a=0, b=0, c=1, and d=0".

Figure 17A:
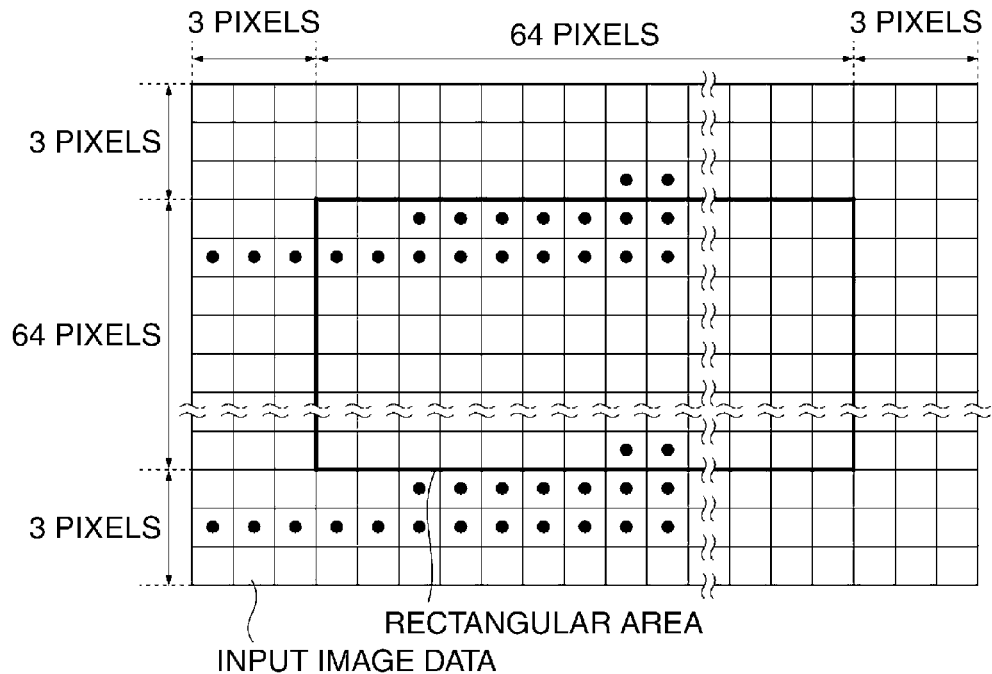
FIG. 17A is a view showing an example of an image before the smoothing process executed by the logical circuit in FIG. 10.
Figure 17B:
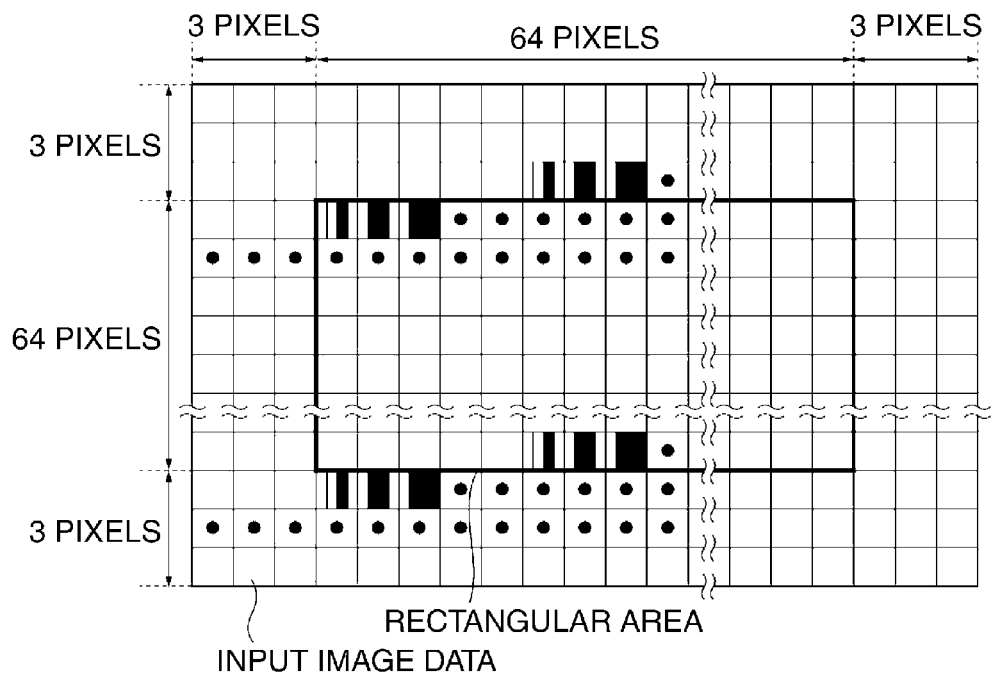
FIG. 17B is a view showing an example of the image after the smoothing process executed by the logical circuit in FIG. 10.

One example of an image obtained by the above-mentioned smoothing process is shown in FIG. 17A and FIG. 17B. FIG. 17A is a view showing an example of an image before the smoothing process executed by the logical circuit in FIG. 10, and FIG. 17B is a view showing the image after the smoothing process. In FIG. 17A, a pixel indicated by a dot is equivalent to the black dot data in FIG. 14 through FIG. 16. In FIG. 17B, a pixel indicated by a dot means that all sections in one pixel are printed. In FIG. 17B, a pixel that is partially filled by a black section means that a part of four sections (black) is printed and the other sections (white) are not printed.

FIG. 17A and FIG. 17B show the example where the unit of the rectangle that is outputted by the image processing unit is equivalent to 64-by-64 pixels. The image processing unit processes the image area of 70-by-70 pixels including the overlapped areas. As mentioned above, since one pixel is divided into four sections and determined "print" or "no-print" for each section, an edge and an outline of a character can be smoothed. This is because electric potential of a latent image on a photosensitive drum can be smoothed by this process, and this is a phenomenon peculiar to electrophotography. It should be noted that although this embodiment describes the smoothing process in a substantially horizontal line, the smoothing process in a substantially vertical line, in a slant line, or along an outline of a character can be achieved by taking a logical AND of logical data of the forty nine pixels. In any case, the print area and the laser light amount for the target pixel are determined so that the electric potential of the latent image on the photosensitive drum is connected smoothly to obtain a smooth printing result. Further, the outputs a, b, c, and d from the logical circuit 41 are converted into a protocol of the data bus by the interface unit 10 and then outputted.

According to the first embodiment, since the image processing is executed to the rectangular areas of the image data developed onto the main memory 102 as the target pixels in the order different from a normal order, needless consumption of memory band can be reduced and duplicated access to the main memory can be controlled.

Further, the first embodiment enables to improve speed performance of the image processing. That's because access latency between the image processing unit and the cache memory is shorter than access latency between the image processing unit and the main memory. There are several reasons. A DRAM that is cheap in cost but complicated in control is used as the main memory. Since the main memory is configured to be accessed from other devices, the latency increases due to mediation with the other devices. Since an SRAM can be used as the cache memory, the latency between a time when the image processing unit requests data and a time when the data is obtained is short. For example, it is assumed that the size of the rectangular area is 64-by-64 pixels and the size of the reference area is 70-by-70 pixels. According to a conventional method, a ratio of duplicated accesses to all accesses was 20 percent as described by the following formula. The band of the main memory of this ratio was consumed wastefully. The present invention enables to avoid this waste.

$$(70^2-64^2)/64^2 \times 100 = 20 \text{ (percent)}$$

A second embodiment of the present invention is different from the first embodiment mentioned above in a point where a lattice area where overlapped areas cross is included in an extended area in the principal scanning direction. Hereafter, only points different from the first embodiment will be described.

Figure 18:
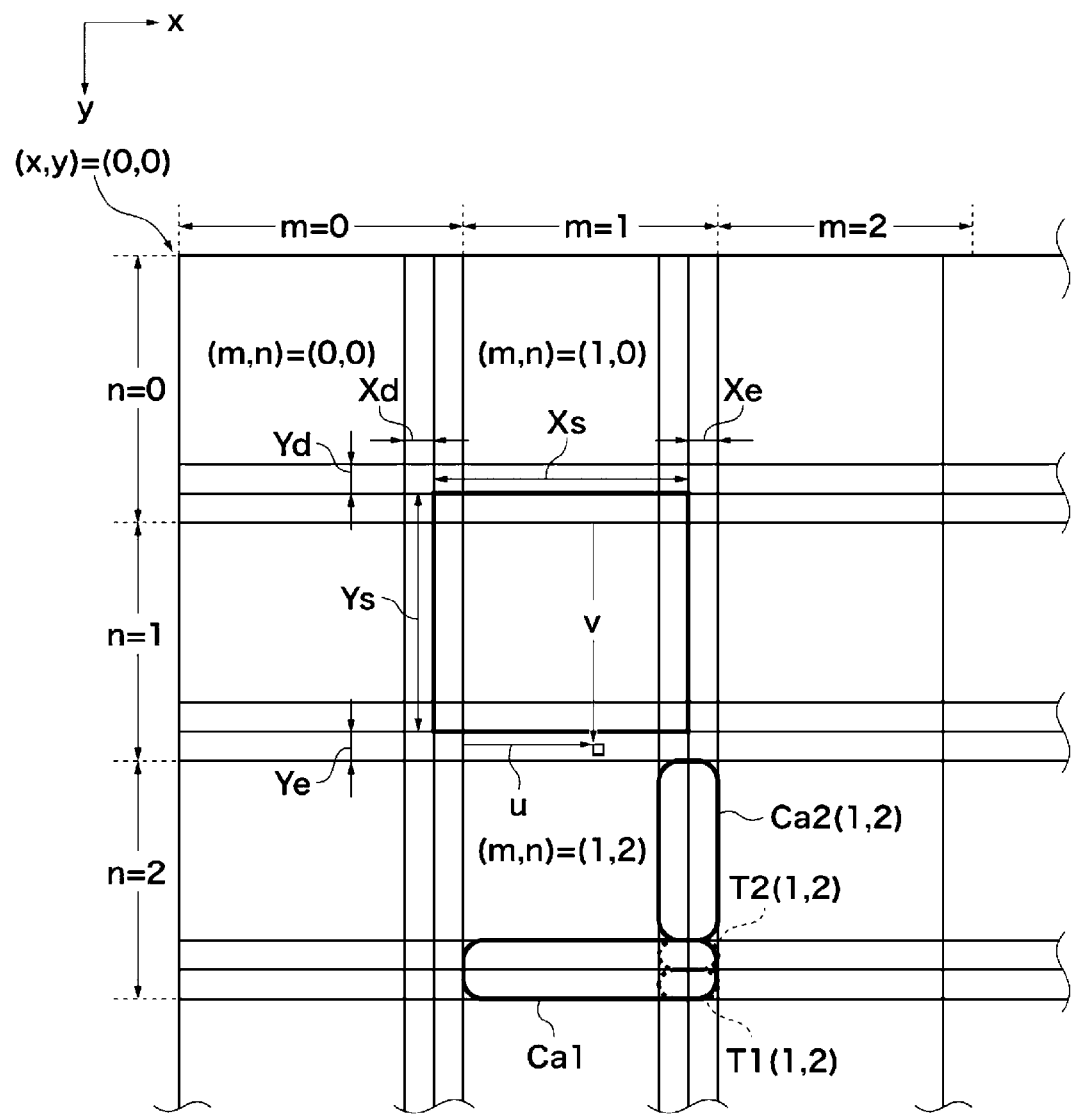
FIG. 18 is a view showing the image data for describing definitions of constants used in a second embodiment of the present invention.

FIG. 18 is a view for describing definitions of constants used in the second embodiment of the present invention.

In FIG. 18, an area Ca1(1, 2) corresponding to the area C1(1, 2) in FIG. 3 includes extended areas T1(1, 2) and T2(1, 2) along the horizontal side. An area Ca2(1, 2) is shortened by a length of the extended areas T1(1, 2) and T2(1, 2) as compared with the corresponding area C2(1, 2) in FIG. 3.

Figure 19:
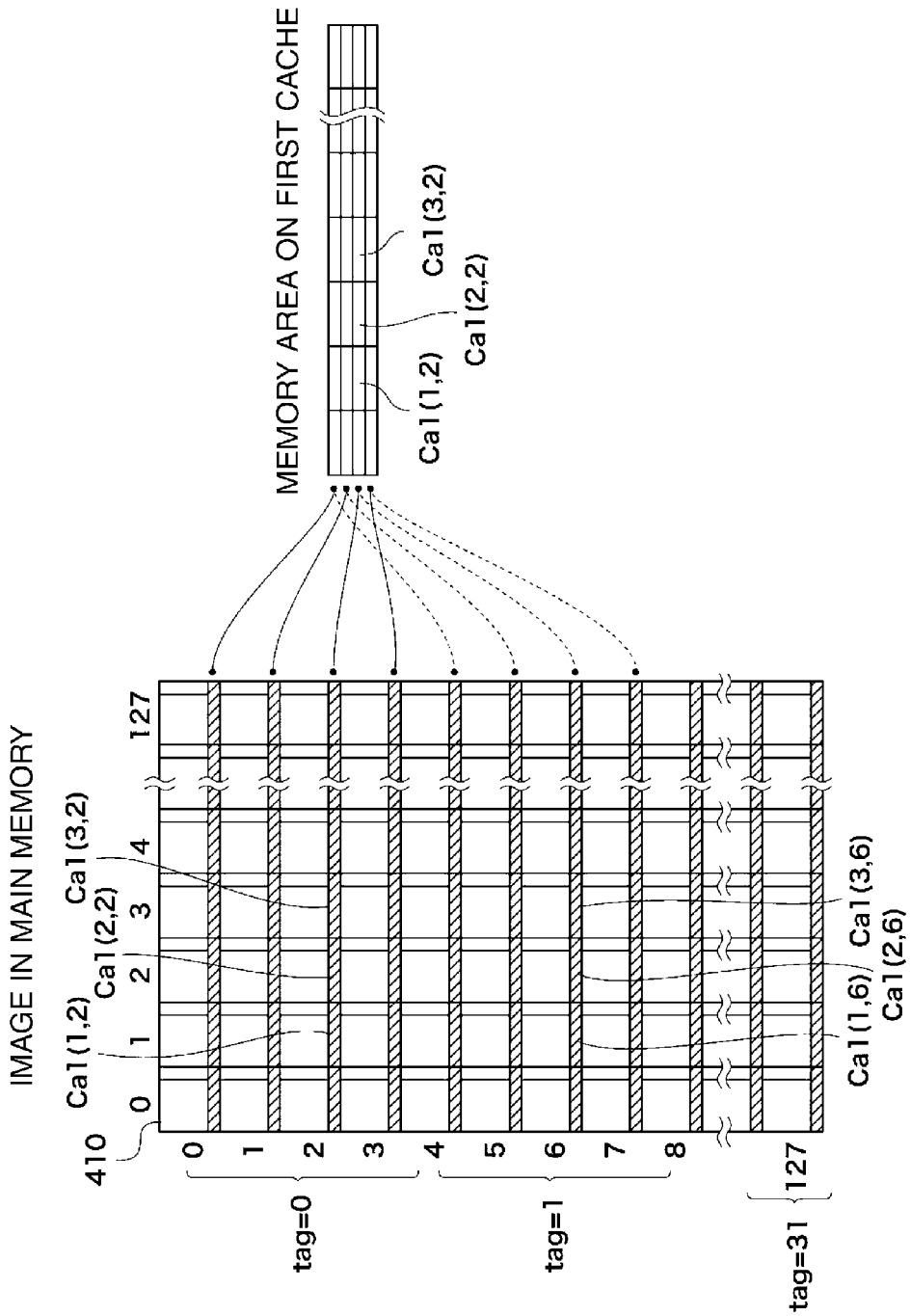
FIG. 19 is a view showing a correspondence relationship between the image data in a main memory and a memory area on a first cache according to the second embodiment.
Figure 20:
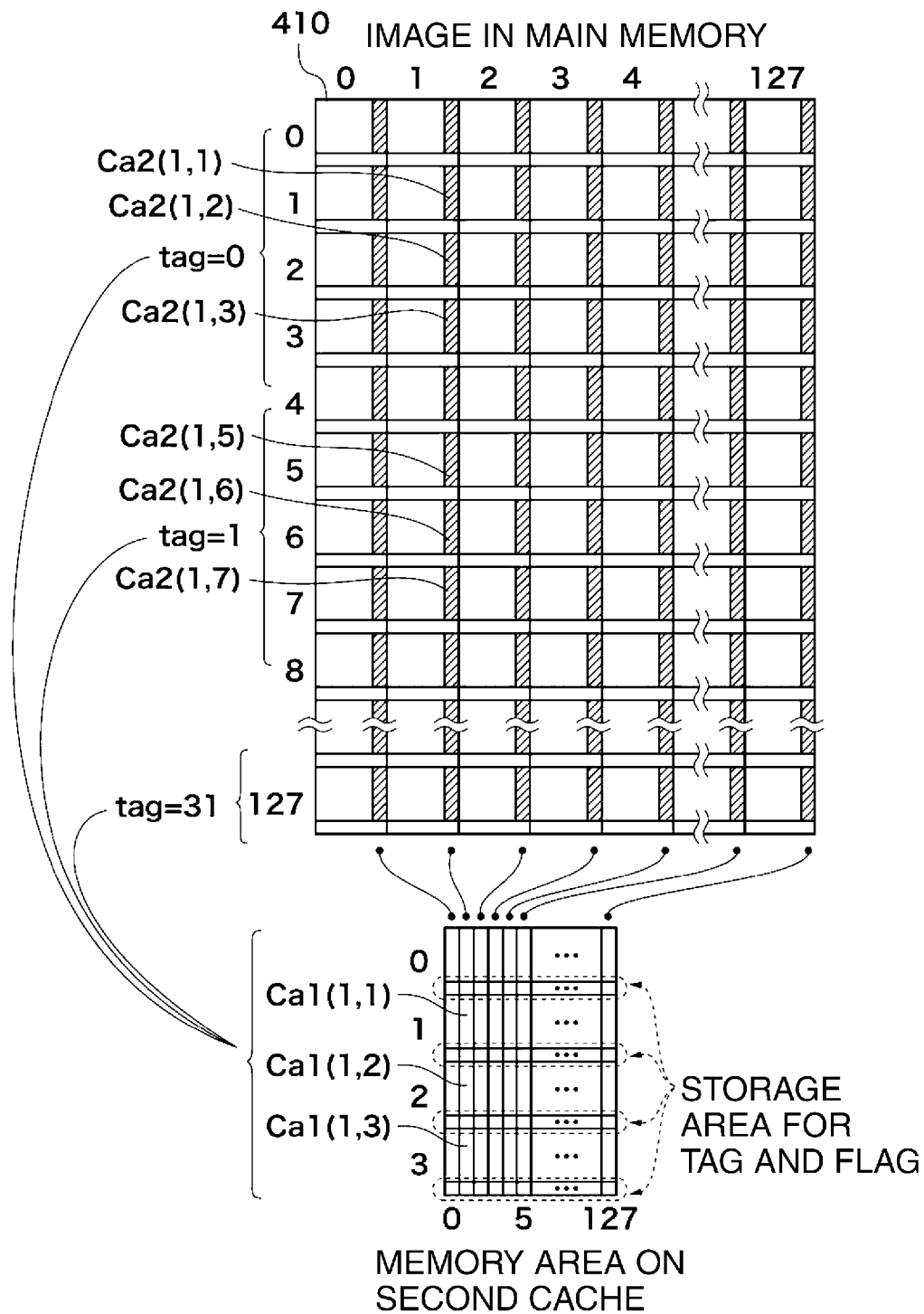
FIG. 20 is a view showing a correspondence relationship between the image data in the main memory and a memory area on a second cache according to the second embodiment.

FIG. 19 is a view showing a correspondence relationship between the image data in a main memory and a memory area of a first cache according to the second embodiment. FIG. 20 is a view showing a correspondence relationship between the image data in the main memory and a memory area of a second cache according to the second embodiment. It should be noted that the same symbols are assigned to components identical to those in FIG. 3 and FIG. 4, and their descriptions are omitted.

In FIG. 19, an overlapped area Ca1(m, n) in an image 410 corresponds to one storage area of the first cache 105. In this embodiment, the first cache 105 has a capacity corresponding to overlapped areas within the entire range in the principal scanning direction and four pieces of the rectangular areas in the auxiliary scanning direction. For example, areas Ca1(1, 2), Ca1(2, 2), and Ca1(3, 2) in the image 410 are equivalent to areas Ca1(1, 2), Ca1(2, 2), and Ca1(3, 2) in the first cache 105. Areas Ca1(1, 6), Ca1(2, 6), and Ca1(3, 6) in the image 410 correspond to areas Ca1(1, 2), Ca1(2, 2), and Ca1(3, 2) in the first cache 105. That is, if data in the area Ca1(1, 6) is accessed after data in the area Ca1(1, 2) is cached, the data in the first cache 105 is overwritten.

In FIG. 20, an overlapped area Ca2(m, n) in the image 410 corresponds to one storage area of the second cache 106. In this embodiment, the second cache 106 has a capacity corresponding to overlapped areas within the entire range in the principal scanning direction and four pieces of the rectangular areas in the auxiliary scanning direction. For example, areas Ca2(1, 1), Ca2(1, 2), and Ca2(1, 3) in the image 410 are equivalent to areas Ca2(1, 1), Ca2(1, 2), and Ca2(1, 3) in the second cache 106. Areas Ca2(1, 5), Ca2(1, 6), and Ca2(1, 7) in the image 410 correspond to areas Ca2(1, 1), Ca2(1, 2), and Ca2(1, 3) in the second cache 106. That is, if data in the area Ca2(1, 5) is accessed after data in the area Ca2(1, 1) is cached, the data in the second cache 106 is overwritten.

The cache control unit 104 decodes data in an address area for four rectangles in the auxiliary scanning direction, and calculates an address of a cache memory. It is necessary to store a higher order address, which distinguishes the address area from others, into the cache as tag information. The flag information for determining whether the data in the cache is valid or not is also required.

The tag information and flag information mentioned above are prepared for the respective data units in a cache in a general cache. However, since a unit of update of the cache memory is necessarily corresponding to an area of each side of a rectangle in the system according to this embodiment, a set of the tag information and flag information can be stored in an area that belongs to the each side. That is, it is possible to reduce areas to store the tag information and flag information as compared with a general cache system. It should be noted that another SRAM may be prepared in order to store information about the tag and flag. However, since an increase in the number of devices by preparing another SRAM has great influence upon an occupation area on a semiconductor, it is desirable to store into a free area of the second cache.

The above-mentioned free area is an area where the overlapped areas cross like a lattice. Since this lattice area is allocated to the first cache, the cache memory does not use this area to store data. The lattice area where the overlapped areas cross may be included in the first cache (the first embodiment).

FIG. 21 is a flowchart showing a control process of the cache control unit according to the second embodiment. It should be noted that steps that are identical to those in FIG. 6 are represented by the same step numbers and their descriptions are omitted.

In step S705 in FIG. 21, the cache control unit 104 determines whether the requested address is included in the overlapped area of the first cache 105. When the following conditional expression is satisfied, the above-mentioned address is included in the overlapped area of the first cache 105.

$$Y_s - Y_d \leq v < Y_s + Y_e$$

When it is determined that the requested address is included in the overlapped area of the first cache 105 (YES in the step S705) as a result of the determination in the step S705, the process proceeds to step S710.

In the step S710, cache information (information about a tag and a flag of a cache) of the right-side overlapped area of the rectangle specified by (m, n) is read from the second cache 106. The address where the cache information is stored in the second cache 106 is given by the following formula.

$$(Y_s+1)(X_d+X_e)P/X_s + m(X_d+X_e)$$

Next, in step S511, when the cache flag in the right-side overlapped area is valid (YES in the step S511), the cache control unit 104 reads data from the first cache 105 in step S712. The address where the data in the first cache 105 is stored is given by the following formula.

$$P\{n(Yd+Ye)+v-Ys+Yd+Ye\}+x$$

When it is determined that the requested address is not included in the overlapped area of the first cache 105 (NO in the step S705) as a result of the determination in the step S705, the process branches to step S706. It is determined whether the requested address is included in the overlapped area of the second cache 106 by the following conditional expression. When the following conditional expression is satisfied, it means that the requested address is included in the overlapped area of the second cache 106.

$$Xs-Xd \leq u < Xs+Xe$$

When it is determined that the requested address is not included in the overlapped area (NO in the step S706) as a result of the determination in the step S706, the process proceeds to the step S516. On the other hand, when it is determined that the requested address is included in the overlapped area in the second cache 106 (YES in the step S706), the cache control unit 104 reads data from the second cache 106 in step S707. The address where the data is stored in the second cache 106 is given by the following formula.

$$y(Xd+Xe)P/Xs+m(Xd+Xe)+u-Xs+Xd+Xe$$

In the step S508, if the cache flag in the right-side overlapped area is invalid (NO in the step S508), the process proceeds to the step S513. On the other hand, when the cache flag in the right-side overlapped area is valid (YES in the step S508), the cache control unit 104 reads data from the second cache 106 in step S709.

As mentioned above, the second embodiment has the same effect as the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-089065, filed Apr. 1, 2009, which is hereby incorporated by reference herein in its entirety.

What is claimed is:

1. An image processing apparatus comprising:
   a first storage unit adapted to store image data;
   a reading unit adapted to read the image data stored in said first storage unit and to divide the image data into a plurality of rectangular areas of a predetermined size;
   a second storage unit adapted to store image data in reference areas surrounding the plurality of rectangular areas, the reference areas having overlapped areas each of which includes a boundary between adjacent two rectangular areas;
   an image processing unit adapted to perform an image process based on the image data in the rectangular areas read by said reading unit and the image data in the reference areas stored in said second storage unit; and
   a cache control unit adapted to control to transfer the image data in the reference areas from said second storage unit to said image processing unit in response to a request from said image processing unit.

2. The image processing apparatus according to claim 1, wherein said second storage unit comprises
   a first cache that stores image data in a part of the overlapped areas that is an overlapped area in a principal direction except a lattice area where the overlapped area in the principal direction crosses an overlapped area in an auxiliary direction, and
   a second cache that stores image data in the remaining part of the overlapped areas that is the overlapped area in the auxiliary direction including the lattice area.

3. The image processing apparatus according to claim 1, wherein said second storage unit comprises
   a second cache that stores image data in a part of the overlapped areas that is an overlapped area in an auxiliary direction except a lattice area where an overlapped area in a principal direction crosses an overlapped area in the auxiliary direction, and
   a first cache that stores image data in the remaining part of the overlapped areas that is the overlapped area in the principal direction including the lattice area.

4. An image processing method comprising:
   a first storing step of storing image data into a first storage unit;
   a reading step of reading the image data stored in the first storage unit and of dividing the image data into a plurality of rectangular areas of a predetermined size;
   a second storing step of storing image data in reference areas surrounding the plurality of rectangular areas into a second storage unit, the reference areas having overlapped areas each of which includes a boundary between adjacent two rectangular areas;
   an image processing step of performing an image process by an image processing unit based on the image data in the rectangular areas read in said reading step and the image data in the reference areas stored in the second storage unit; and
   a cache control step of controlling to transfer the image data in the reference areas from the second storage unit to the image processing unit in response to a request from the image processing unit.

5. The image processing method according to claim 4, wherein the second storage unit comprises
   a first cache that stores image data in a part of the overlapped areas that is an overlapped area in a principal direction except a lattice area where the overlapped area in the principal direction crosses an overlapped area in an auxiliary direction, and
   a second cache that stores image data in the remaining part of the overlapped areas that is the overlapped area in the principal direction including the lattice area.

6. The image processing method according to claim 4, wherein the second storage unit comprises
   a second cache that stores image data in a part of the overlapped areas that is an overlapped area in an auxiliary direction except a lattice area where an overlapped area in a principal direction crosses the overlapped area in the auxiliary direction, and
a first cache that stores image data in the remaining part of the overlapped areas that is the overlapped area in the principal direction including the lattice area.

7. A computer-readable storage medium storing a control program causing a computer to execute the image processing method according to claim 4.

* * * * *